United States Patent [19]

Thum

[11] Patent Number: 5,259,661
[45] Date of Patent: Nov. 9, 1993

[54] TORSION-RESISTANT VEHICLE UNDERBODY

[75] Inventor: Holger M. Thum, Braunschweig, Fed. Rep. of Germany

[73] Assignee: Volkswagen AG, Wolfsburg, Fed. Rep. of Germany

[21] Appl. No.: 957,992

[22] Filed: Oct. 8, 1992

[30] Foreign Application Priority Data

Oct. 12, 1991 [DE] Fed. Rep. of Germany ....... 4133865

[51] Int. Cl.⁵ .............................................. B62D 23/00
[52] U.S. Cl. .................................. 296/204; 296/203; 296/29
[58] Field of Search .............. 296/29, 203-205; 280/796, 798, 785

[56] References Cited

U.S. PATENT DOCUMENTS

| | | | |
|---|---|---|---|
| D. 149,830 | 6/1948 | Nelson | 280/798 X |
| 2,177,896 | 10/1939 | Lee | 296/205 |
| 2,254,497 | 9/1941 | Schäfer | 280/797 |
| 2,389,907 | 11/1945 | Helmuth | 296/29 X |
| 2,580,156 | 12/1951 | Brown | 296/203 |
| 3,002,782 | 10/1961 | Jahn | 296/204 |
| 4,355,844 | 10/1982 | Muzzarelli | 296/205 |
| 4,950,026 | 8/1990 | Emmons | 296/205 X |
| 4,986,597 | 1/1991 | Clausen | 296/204 X |
| 5,074,587 | 12/1991 | Schwede et al. | 296/204 X |

FOREIGN PATENT DOCUMENTS

| | | | |
|---|---|---|---|
| 2161907 | 7/1972 | Fed. Rep. of Germany | 296/203 |
| 667735 | 4/1928 | France . | |
| 748379 | 4/1933 | France | 296/205 |
| 219541 | 11/1939 | Switzerland . | |
| 626294 | 7/1945 | United Kingdom | 296/204 |
| 728346 | 4/1955 | United Kingdom | 296/203 |

OTHER PUBLICATIONS

The Autocar, 17 Aug. 1956, p. 211 Frame of Aston Martin Type DB R1-250.

*Primary Examiner*—Dennis H. Pedder
*Attorney, Agent, or Firm*—Brumbaugh, Graves, Donohue & Raymond

[57] ABSTRACT

A torsion-resistant vehicle underbody which may be used in convertibles contains a four-sided supporting arrangement and a cross-shaped supporting arrangement consisting of two diagonal supports which are rigidly connected together at their crossing points and are connected at their ends with the four-sided supporting arrangement.

6 Claims, 3 Drawing Sheets

TORSION-RESISTANT VEHICLE UNDERBODY

BACKGROUND OF THE INVENTION

This invention relates to torsion-resistant vehicle underbodies having a four-sided support arrangement.

French Patent No. 667,735 discloses a vehicle underbody having a four-sided supporting arrangement in the form of a square in which two further supports extend generally parallel to the longitudinal axis of the vehicle but slightly inclined on each side thereof and are directly connected with the four-sided supporting arrangement at their crossing points with the latter. The corners of the four-sided supporting arrangement in turn are connected with a surrounding square supporting arrangement.

Other prior art, such as Swiss Patent No. 219,541 and U.S. Pat. No. 2,254,497, disclose supporting arrangements having two supports running diagonally with respect to one another, which constitute cross-like supporting arrangements. These cross-like supporting arrangements are disposed within surrounding curved or rectangular supporting arrangements.

Although such conventional vehicle underbodies have a relatively high torsional and thrust rigidity, it is insufficient in many cases, especially in a convertible, in which bracing by a rigid roof is absent.

SUMMARY OF THE INVENTION

Accordingly, it is an object of the present invention to provide a torsion-resistant vehicle underbody which overcomes the disadvantages of the prior art.

Another object of the invention is to provide a torsion-resistant vehicle underbody with increased torsion and thrust resistance in a simple manner.

These and other objects of the invention are attained by providing a vehicle underbody having a four-sided supporting arrangement with two opposed corners lying on a longitudinal axis of the vehicle and two supports extending obliquely with respect to the longitudinal axis to form a cross-shaped support arrangement with the supports rigidly connected at their intersection which is approximately at the center of the four-sided supporting arrangement.

It has been found, surprisingly, that a substantial increase in torsional and thrust rigidity is obtained when a four-sided supporting arrangement is combined with a crosslike supporting arrangement. A true synergistic effect is obtained with this arrangement since the resulting rigidity of the underbody, when properly designed, is greater than the sum of the individual rigidities of the two discrete supporting arrangements.

The invention is also useful in numerous special designs so that an adaptation to a particular application is easily possible.

Such designs include the possibility of connecting a variety of supports together elastically or with articulation (i.e., to make the support arrangement soundproof), while a rigid connection must, of course, be provided at the crossing point of the supports forming the cross-like supporting arrangement. The supports, which may be made as discrete individual supports or, alternatively, by crimps in sheet metal or some other plate, must likewise be resistant to bending but they may be nonrigid torsionally.

This possibility of variation in design of the underbody also makes it possible to design the latter with minimal weight.

BRIEF DESCRIPTION OF THE DRAWINGS

Further objects and advantages of the invention will be apparent from a reading of the following description in conjunction with the accompanying drawings, in which:

FIG. 1A is a magnified view of portions of FIG. 1;

DESCRIPTION OF PREFERRED EMBODIMENTS

Figure 1:
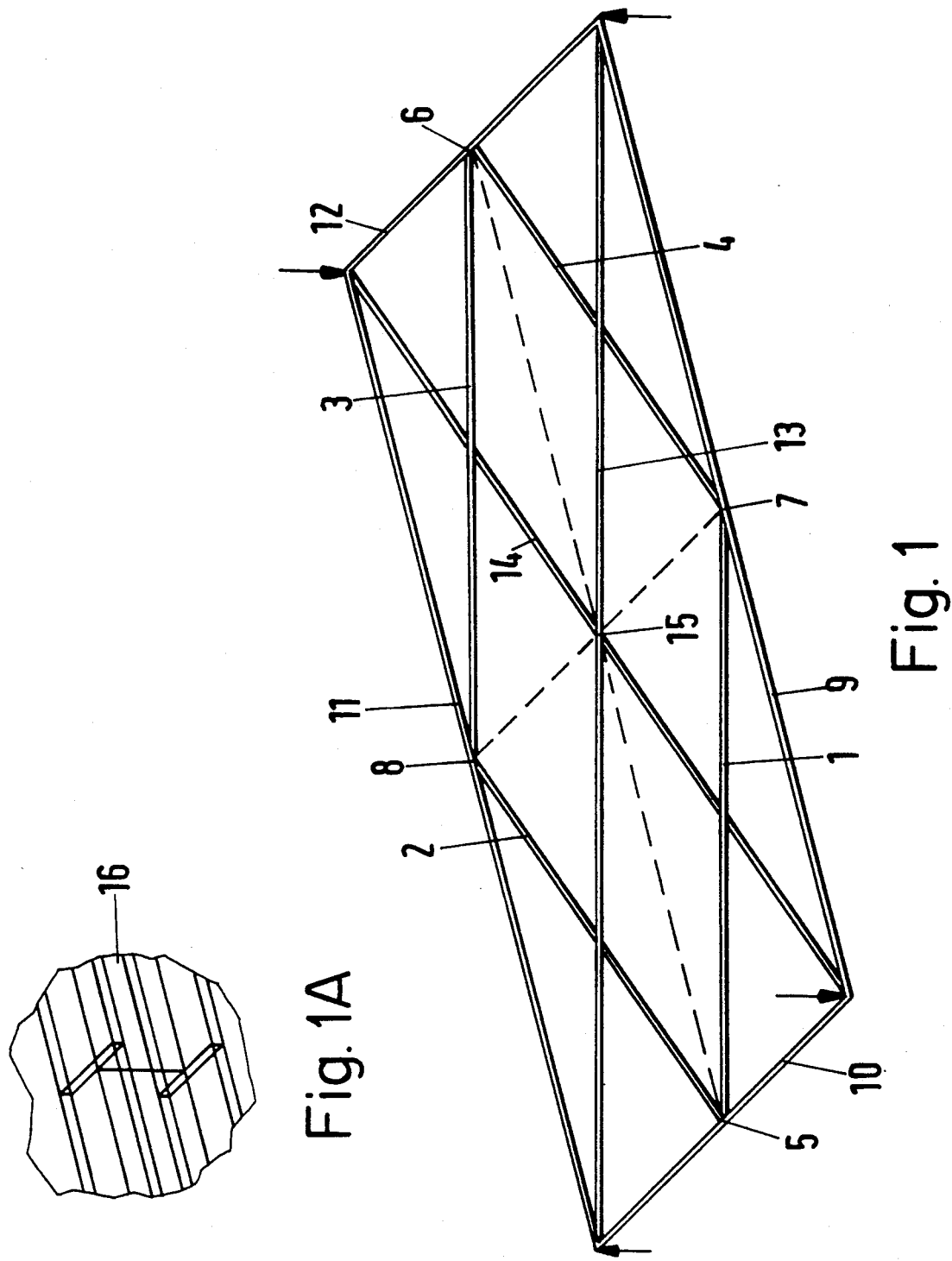
FIG. 1 is a schematic perspective view illustrating a representative vehicle underbody arranged according to the invention.

Considering first the embodiment shown in FIG. 1, three interconnected supporting arrangements are shown. One foursided supporting arrangement consists of the four supports 1, 2, 3 and 4 having opposite corners 5 and 6 spaced along a longitudinal axis of the vehicle. The corners 5, 6, 7 and 8 of this four-sided supporting arrangement are elastically connected or optionally articulated with four supports 9, 10, 11 and 12 of a surrounding rectangular supporting arrangement into the four corner points of which the forces exerted by the wheels of the vehicle are introduced, as indicated by the arrows in FIG. 1.

FIG. 1 also shows a cross-shaped supporting arrangement consisting of two diagonal supports 13 and 14, which are elastically connected at their ends or optionally articulated with the corners of the surrounding supporting arrangement made up of the supports 9-12, and the two diagonal supports 13 and 14 are rigidly connected together at their crossing point 15.

In this example, the supports are designed with an I-shaped cross-section 16, i.e., they are resistant to bending but relatively nonrigid torsionally. Nevertheless, because of the combination of three supporting arrangements, the underbody of this embodiment has high torsional rigidity as well as high thrust resistance.

Figure 2:
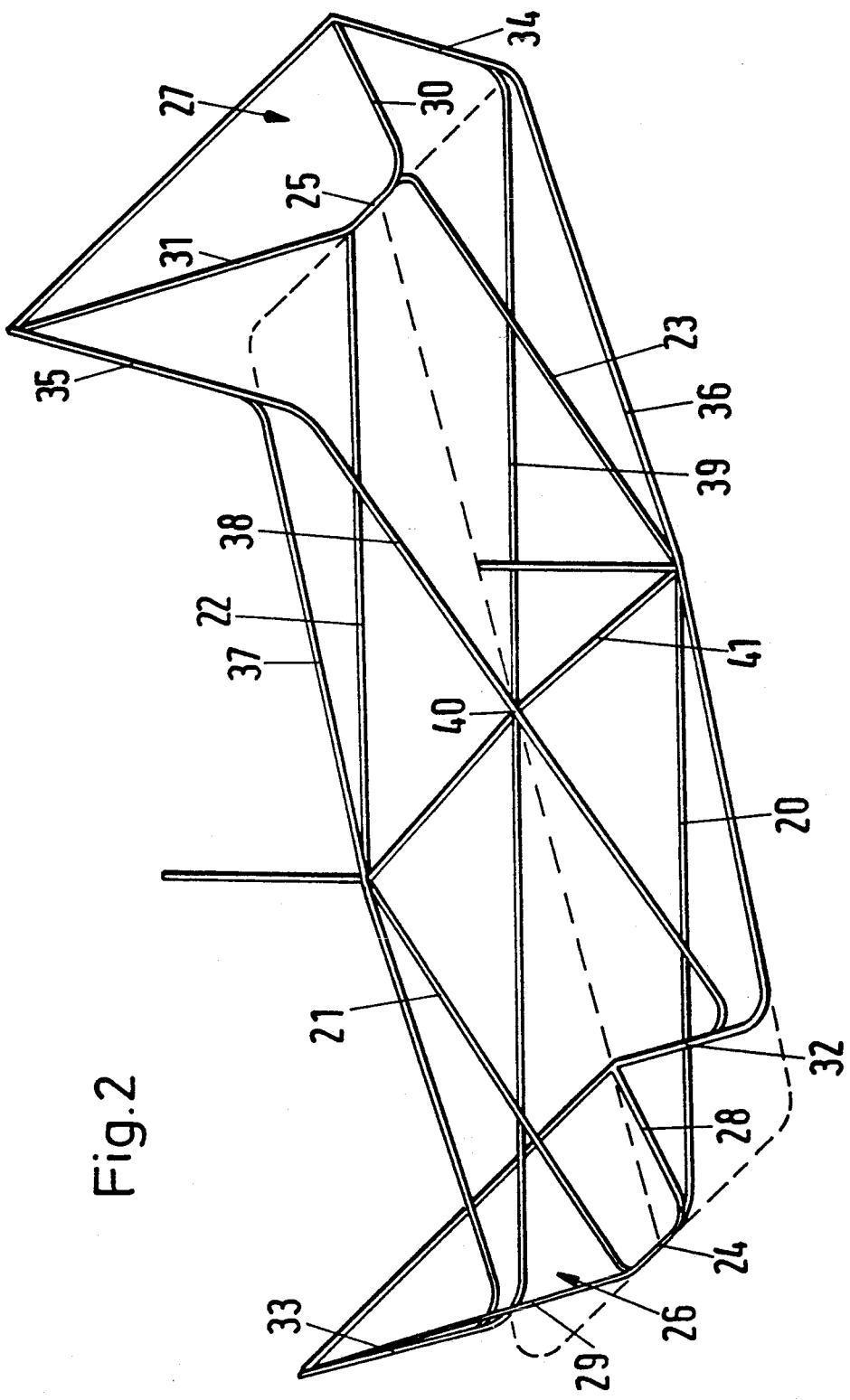
FIG. 2 is a schematic perspective view showing an alternative underbody arrangement in accordance with the invention.

Three supporting arrangements are likewise included in the embodiment shown in FIG. 2. One four-sided supporting arrangement includes four supports 20, 21, 22 and 23. Unlike the four-sided supporting arrangement 1, 2, 3, 4 in the embodiment of FIG. 1, however, the corners of this four-sided supporting arrangement which are spaced along the longitudinal axis of the vehicle are broadened into two supporting regions 24 and 25, which at the same time form a broadened "vertex" of two triangular transverse wall frames 26 and 27. Each of four legs 28, 29 and 30, 31 extends into a turned-up column of the vehicle, for example, into the A columns 32 and 33 and the C columns 34 and 35. These columns in turn are formed by bent-up regions of two supports 36 and 37 which extend substantially parallel to the longitudinal axis of the vehicle and which, like the supporting regions 24 and 25, form components of a surrounding supporting arrangement.

This example likewise contains a cross-shaped supporting arrangement, formed by the diagonal supports 38 and 39, which are joined at their ends to the columns 32, 33, 34 and 35 and are rigidly connected together at their crossing point 40.

The three-dimensional nature of this underbody allows an especially high torsional resistance to be obtained.

An additional increase in resistance is procured by a transverse support 41, which extends through the crossing point 40. In general, additional supports may be provided with advantage as indicated by the broken lines in FIG. 2.

As FIG. 2 clearly reveals, such an underbody is particularly suitable for a convertible.

Figure 3:
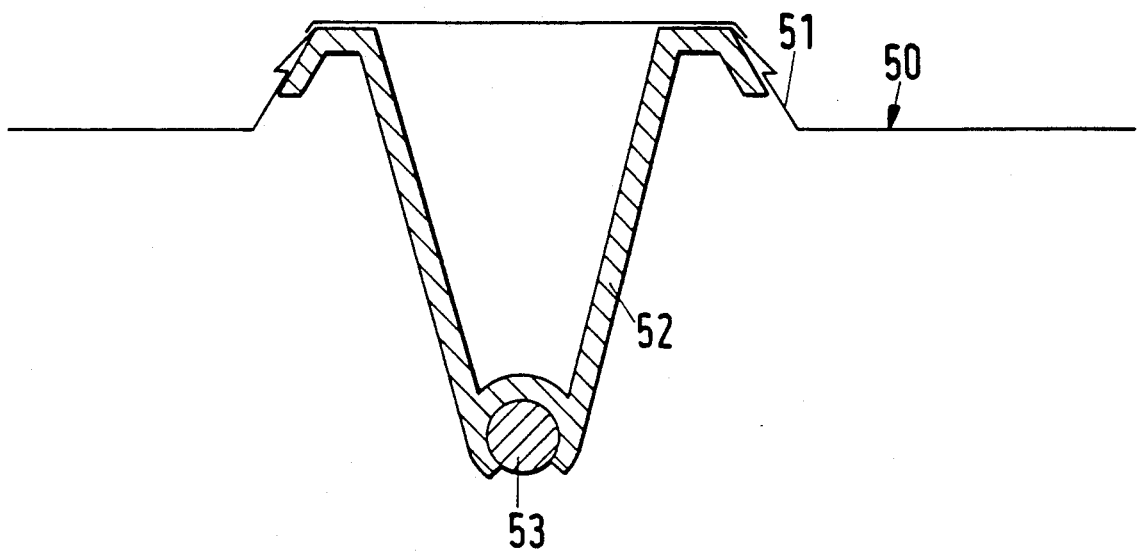
FIG. 3 is an enlarged cross-sectional view showing the arrangement of one form of support for use in the invention.

While the underbodies described in connection with FIGS. 1 and 2 contain not only true supports but also have plate-shaped structural parts, in particular a floor panel, FIG. 3 shows a supporting structure which incorporates a floor panel 50. This floor panel has an upset 51 defining a recess into which a channel-shaped part 52 made of synthetic material is snapped. For reinforcement, a metal wire 53 or some other rigid part is snapped into the part 52 made of synthetic material. Supports formed in this way may constitute at least one of the three supporting arrangements explained above. In principle, it is alternatively possible to form the supports only by crimplike embossments in plates, for example a floor panel, dispensing with additional parts.

The surrounding supporting arrangement may alternatively be trapezoidal.

The invention thus provides a vehicle underbody having high torsional and thrust rigidity which is simple, compact and low in weight.

Although the invention has been described herein with reference to specific embodiments, many modifications and variations therein will readily occur to those skilled in the art. Accordingly, all such variations and modifications are included within the intended scope of the invention.

I claim:

1. A torsion-resistant vehicle underbody comprising a first supporting arrangement having two pairs of opposed structural elements, each element extending between one of two opposing sides and one of two opposing ends of the underbody and two said structural elements intersecting at a generally central point of each of the underbody sides, two supports extending obliquely to the structural elements of the first supporting arrangement and having means joining ends thereof to the first supporting arrangement, the two supports forming a generally cross-shaped supporting arrangement having a crossing point coinciding at least approximately with a center of the first supporting arrangement and being rigidly joined at their crossing point.

2. An underbody according to claim 1, said means joining including a surrounding supporting arrangement and wherein the first supporting arrangement has four corners joined to the ends of the crossshaped supporting arrangement by the surrounding supporting arrangement.

3. An underbody according to claim 1 wherein the structural elements of the first supporting arrangement are joined at the ends of the underbody by supporting additional structural elements extending perpendicular to the longitudinal axis of the vehicle and the supporting additional structural elements form inverted triangular transverse wall frames having legs attached to columns of the vehicle.

4. An underbody according to claim 2 wherein the surrounding supporting arrangement includes support members which extend generally parallel to the longitudinal axis of the vehicle and are bent up to form vehicle columns and the structural elements of the first support arrangement are joined at the ends of the underbody by other support members of the surrounding supporting arrangement which extend perpendicular to the longitudinal axis of the vehicle.

5. An underbody according to claim 1 wherein at least some parts of the supporting arrangements are formed by crimps in flat material.

6. An underbody according to claim 1 wherein at least some of the elements and supports are formed by channel-shaped parts made of synthetic material snapped into recesses of a plate and reinforcements are snapped into the channel-shaped parts.

* * * * *